Sept. 18, 1928.

U. A. RABIE

DIVIDER

Filed June 10, 1925

Inventor

Uldege A. Rabie

By R. J. Whitaker his Attorney

Patented Sept. 18, 1928.

1,684,886

UNITED STATES PATENT OFFICE.

ULDEGE A. RABIE, OF YAKIMA, WASHINGTON.

DIVIDER.

Application filed June 10, 1925. Serial No. 36,260.

This invention relates to an improved dividing device for sickle bars, being more particularly designed for use in connection with hay mowers, and seeks, among other objects, to provide a device of this character which will effectually prevent the tangling of the falling hay, as it is cut, with the standing growth. It also provides smooth swath, there is no bunching and effects thorough curing of the hay.

The invention seeks, as a further object, to provide a device wherein the falling hay, as it is cut, will be directed away from the standing growth in such manner that the cut swath will lie clear of the standing hay, leaving a clean space clear of freshly cut hay next to the standing growth without bunching and affords thorough curing.

A further object of the invention, in this connection, is to provide a device which will extend in front of the tail-piece of the sickle bar of the mower so as to travel through the standing growth in front of said bar for bending the growth to be cut at the end of the bar over in front of the bar and finally directing such of the growth, when cut away from the end of the bar toward the mower.

And the invention seeks, as a still further object, to provide a device which may be readily applied and which will be well adapted for general use.

Other and incidental objects will appear hereinafter.

Figure 1:
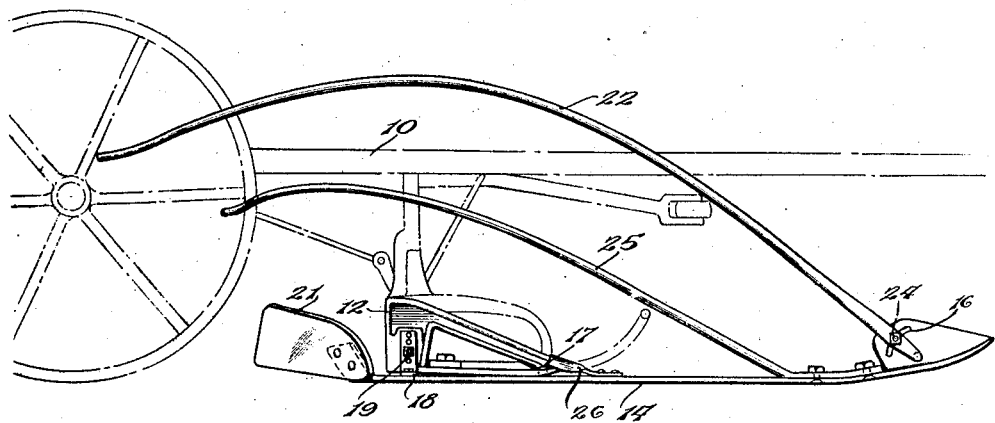
Figure 1 is an elevation showing the device applied to the tail-piece of the sickle bar of a conventional mower.
Figure 2:
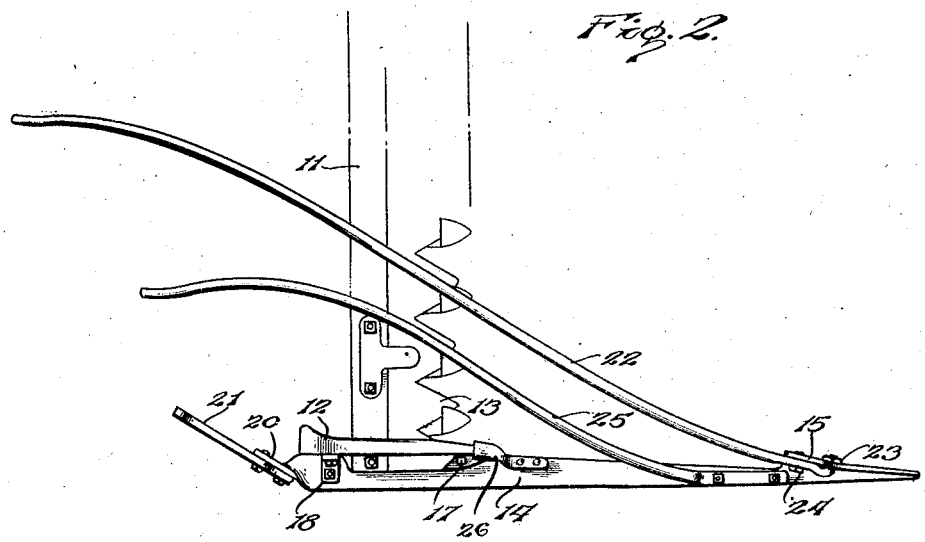
Figure 2 is a plan view of the device.

As is well known, difficulty is experienced in the operation of a mowing machine by reason of the fact that the cut hay often falls into the standing growth, with the result that the mower is caused to choke or cut imperfectly when the next swath is taken. The difficulty is particularly pronounced in connection with a tall growth and is principally caused by the inability of the usual dividing board to deflect the falling hay at the outer end of the sickle bar away from the standing growth. The present invention, therefore, seeks to overcome such difficulty. In the drawings, I have illustrated the improved dividing device in connection with the sickle bar of a conventional mower 10. The sickle bar is indicated at 11, the usual tail-piece at 12, and the knife at 13.

In carrying the invention into effect, I employ an elongated shoe 14 which is flat throughout the major portion of its length and is curved upwardly at its forward end, at which end the shoe is provided at its inner edge with an upstanding plate 15 having an arcuate slot 16. The shoe is preferably tapered toward the forward end thereof and upstanding from said shoe near its rear end is a stud 17 received through the usual opening in the forward end of the tail-piece 12. Secured to the shoe rearwardly of said stud is angle plate 18 and extending through said plate and through the tail-piece is a bolt 19 co-operating with the stud 17 for rigidly securing the shoe in position. Thus, the shoe may be readily attached.

At its rear end, the shoe is given a half twist to define a laterally inclined lug 20 and bolted to said lug is a relatively short dividing board 21 extending rearwardly and inwardly at an angle behind the sickle bar 11. Mounted upon the plate 15 at the forward end of the shoe is an upwardly and inwardly curving finger 22 extending over the outer end of the sickle bar, the plate being disposed at an angle to the shoe so as to properly support the finger. At its forward end the finger 22 is turned laterally to extend through the said plate and screwed on the terminal of the finger is a nut 23 pivotally connecting the finger with the plate. Slightly in the rear of its forward end, the finger is apertured to accommodate a bolt 24 which extends through the slot 16 of the plate 15 so that, as will be seen, the finger may be adjustably elevated or lowered. Bolted at its forward end to the forward end portion of the shoe is a second finger 25 which curves upwardly and inwardly over the outer end of the sickle bar below the finger 22 and nearer the outer terminal of the bar. Both fingers are preferably tapered toward their rear ends and are resilient.

As will now be seen, the shoe 14 extends considerably in advance of the tail-piece 12 so that as the sickle bar 11 moves forwardly, the shoe will travel through the standing growth in advance of said bar. Accordingly, the growth in the path of the outer end of the bar will be bent inwardly by the fingers 22 and 25 in front of the knife so that when such portion of the growth is severed it will cause to fall by said fingers away from the standing hay at the rear of the sickle bar. Further the dividing board will track the tail-piece 12 for pushing any stray stems away from the standing growth so that a clean path will be made along the edge of the growth. Fixed at its forward end to the shoe 14 is a resilient guard 26, the rear end of which is channeled to fit over the forward end of the tail-piece 12 of the cutter bar 11 so that the guard will thus prevent the clogging or bunching of hay between said tail-piece and the shoe.

It must be understood that only a preferred form of my invention is herein shown and described and that any departure from the same such as in shape, size, arrangement or number of parts may be resorted to without departing from the spirit of the invention or from the scope of the subjoined claim.

Having thus described my invention, what I claim and desire to protect by Letters Patent in the United States is:

A divider attachment for a mower of the type having a sickle bar and tail-piece, said divider comprising an elongated shoe extending perpendicularly to the sickle bar and detachably mounted on the tail-piece, the shoe being also adjustable on said tail-piece to cut grass of different heights at different times; said shoe being angularly twisted at its rear end to define a laterally inclined lug, a divider board attached to said twisted portion of said shoe to throw grass to the rear of the mower into a withdraw; an inwardly and upwardly turned plate formed from the end of the shoe, a dividing finger projecting through said plate and adjustably mounted thereon, and a second finger non-adjustably connected to the shoe, the angle of the upward and inward twist of the two fingers being approximately the same.

ULDEGE A. RABIE.